United States Patent [19]
Shim

[11] Patent Number: 6,088,723
[45] Date of Patent: Jul. 11, 2000

[54] OPTICAL CATV SYSTEM HAVING ENHANCED TRANSMISSION EFFICIENCY OF COMMUNICATION CHANNELS

[75] Inventor: Kee Pyong Shim, Kyoungki-do, Rep. of Korea

[73] Assignee: Hyundai Electronics Ind. Vo., Ltd., Seoul, Rep. of Korea

[21] Appl. No.: 08/976,755

[22] Filed: Nov. 24, 1997

[30] Foreign Application Priority Data

Dec. 30, 1996 [KR] Rep. of Korea ....................... 96-77865

[51] Int. Cl.[7] .................................................. H04N 7/10
[52] U.S. Cl. .................................. 709/217; 348/6; 348/12
[58] Field of Search .............................. 348/6, 7, 10, 12, 348/13; 435/3.1, 4.1, 4.2, 5.1, 32; 709/217–219; H04N 7/10

[56] References Cited

U.S. PATENT DOCUMENTS

| | | |
|---|---|---|
| 4,805,014 | 2/1989 | Sahara et al. . |
| 5,719,872 | 2/1998 | Dubbery et al. ................... 348/6 X |
| 5,818,825 | 10/1998 | Corrigan et al. ................... 348/13 X |
| 5,847,660 | 12/1998 | Williams et al. ................... 348/6 X |

*Primary Examiner*—Nathan Flynn
*Attorney, Agent, or Firm*—Lawrence G. Kurland, Esq.; Bryan Cave LLP

[57] ABSTRACT

An optical CATV system having enhanced transmission efficiency of communication channels, which offers voice telephone and narrow-band ISDN services, includes: a distribution center for transmit a voice telephone data frame and a narrow-band ISDN data frame over one E1 frame; and a subscriber unit separately generating the voice telephone and narrow-band ISDN data frames from the E1 frame transferred from the distribution center.

6 Claims, 3 Drawing Sheets

FIG. 2

| TIME SLOT | CHANNEL USAGE |
|---|---|
| 0 | FRAME ALIGNMENT/MAINTENANCE |
| 1 | B-CH |
| 2 | B-CH        SUBSCRIBER1 |
| 3 | B-CH _____ |
| 4 | B-CH |
| 5 | B-CH        SUBSCRIBER2 |
| 6 | B-CH _____ |
| 7 | B-CH |
| 8 | B-CH        SUBSCRIBER3 |
| 9 | B-CH |
| 10 \| 15 | SPACE |
| 16 17 | CAS |
| 18 | B1 |
| 19 | B2           SUBSCRIBER1 |
| 20 | D |
| 21 | Cv _____ |
| 22 | B1 |
| 23 | B2           SUBSCRIBER2 |
| 24 | D |
| 25 | Cv _____ |
| 26 | B1 |
| 27 | B2           SUBSCRIBER3 |
| 28 | D |
| 29 | Cv |
| \| 31 | SPACE |

| TIME SLOT | CHANNEL USAGE |
|---|---|
| 0 | FRAME ALIGNMENT/MAINTENANCE |
| 1 | B-CH |
| 2 | B-CH    SUBSCRIBER1 |
| 3 | B-CH |
| 4<br>|<br>31 | SPACE |

| TIME SLOT | CHANNEL USAGE |
|---|---|
| 0 | FRAME ALIGNMENT/MAINTENANCE |
| 1 | B1 |
| 2 | B2    SUBSCRIBER1 |
| 3 | D |
| 4 | Cv |
| 5<br>|<br>31 | SPACE |

OPTICAL CATV SYSTEM HAVING ENHANCED TRANSMISSION EFFICIENCY OF COMMUNICATION CHANNELS

BACKGROUND OF THE INVENTION

1. Field of the Invention

The present invention relates to an optical CATV system and, more particularly, to an optical CATV system having enhanced transmission efficiency of communication channels to offer voice telephone and narrow-band ISDN services over one E1 (2.048 Mbps) frame between subscriber units and a distribution center.

2. Discussion of Related Art

In general, as shown in FIG. 3, CATV system comprises a transmit facility such as head end, a transmission facility such as cables, interexchange amplifiers or the like, and a terminal facility connected to terminals such as television and telephone. U.S. Pat. No. 5,600,656 discloses a typical CATV system, which converts a plurality of broad-band satellite channel signals into proper ones for a corresponding receiver to transmit them over a plurality of channels. It is thus designed to interface a plurality of channel signals through one system.

The optical CATV system uses optical fibers as cables in the transmission facility for transmitting TV/stereo audio signals, voice telephone network service and narrow-band ISDN communication service to subscribers. As compared with conventional telephone wire or coaxial cable, the optical fibers have several advantages: their broad bandwidth results in a low cost per channel, high reliability for data transmission, and low error rate. The optical fibers are also capable of being installed at a low costs because it is small in size and light-weighted.

The subscriber unit of the optical CATV system affords to three subscribers, according to the regulations, allotting three channels to one subscriber for the voice telephone (B-CH) service and four time slots of an E1 frame for the narrow-band ISDN service.

Light signals of 155 Mbps received between the distribution center DC for distributing the services to each subscriber and the subscriber terminals are converted into electrical signals and demultiplexed to separately offer the services. The light signals of 155 Mbps are allotted by E1 system for the voice telephone and narrow-band ISDN services, serving nine channels for a voice telephone and channels for three subscribers for a narrow-band ISDN.

E1 (2.048 Mbps) system has 30 available channels to offer the voice telephone and narrow-band ISDN services respectively over an E1 frame. Therefore, two E1 (2.048 Mbps) lines per one subscriber are used for the two services. FIG. 4 is a format diagram of a transmission frame allotted for the voice telephone and narrow-band ISDN. Referring to FIG. 4, the voice telephone data is transmitted over one of the 1st to 3rd time slots of the E1 frame and the narrow-band ISDN data is transmitted over the 1st to 4th time slots of the E1 frame.

Since two E1 lines are allotted for one subscriber to offer the voice telephone and narrow-band ISDN services, the voice telephone data is transmitted over one of 32 channels and the ISDN data is transmitted over four channels of the 32 channels, thereby using the channels inefficiently and deteriorating the transmission efficiency.

SUMMARY OF THE INVENTION

Accordingly, the present invention is directed to an optical CATV system having enhanced transmission efficiency of communication channels that substantially obviates one or more of the problems due to limitations and disadvantages of the related art.

An object of the present invention is to provide an optical CATV system having enhanced transmission efficiency of communication channels to offer telephone network service and narrow-band ISDN service with one E1 frame between subscriber units and a distribution center.

Another object of the present invention is to provide an optical CATV system having enhanced transmission efficiency of communication channels by transmitting voice telephone data and narrow-band ISDN data over one E1 frame between a subscriber unit and a distribution center.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an optical CATV system having enhanced transmission efficiency of communication channels, which offers voice telephone and narrow-band ISDN services, comprises: a line interface unit for generating voice telephone and narrow-band ISDN frames transferred from voice telephone/narrow-band ISDN lines at an output terminal, and reversely generating the voice telephone and narrow-band ISDN frames from the output terminal to the voice telephone/narrow-band ISDN lines; a first frame alignment unit for realigning the voice telephone and narrow-band ISDN frames transferred from the line interface unit to monitor the frames' states and generate the result, and performing the reverse process; a first switching unit for multiplexing the voice telephone and narrow-band ISDN frames transferred from the first frame alignment unit over one E1 frame, and performing the reverse process; a second frame alignment unit for realigning the multiplexed frames transferred from the first switching unit to monitor the frames' states, and performing the reverse process; a second switching unit for demultiplexing the frames transferred from the second frame alignment unit over voice telephone and narrow-band ISDN channels, and multiplexing the voice telephone and narrow-band ISDN channels reversely transferred to generate the output to the second frame alignment unit; a frame control unit for bypassing the voice telephone channel transferred from the second switching unit, converting the narrow-band ISDN channel into a format adequate to an ISDN terminal, reading an ISDN physical layer data, bypassing the voice telephone channel reversely transferred to generate it to the second switching unit, and generating the narrow-band ISDN data, reversely transferred, to the second switching unit by E1 frame; an HDLC (High Data Link Controller) unit for analyzing the physical layer data transferred from the frame control unit; a second central processing unit for receiving the monitored result of the frames' states from the second frame alignment unit and the analyzed result of the physical layer data from the HDLC control unit to control the respective units; a tip/ring interface unit for converting the voice telephone data received from the frame control unit into a tip/ring signal; and a matching unit for transmitting the ISDN frame received from the frame control unit to an subscriber ISDN telephone.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2 is a format diagram of a transmission frame of the present invention;

DETAILED DESCRIPTION OF PREFERRED EMBODIMENT

Reference will now be made in detail to the preferred embodiments of the present invention, examples of which are illustrated in the accompanying drawings.

Figure 1:
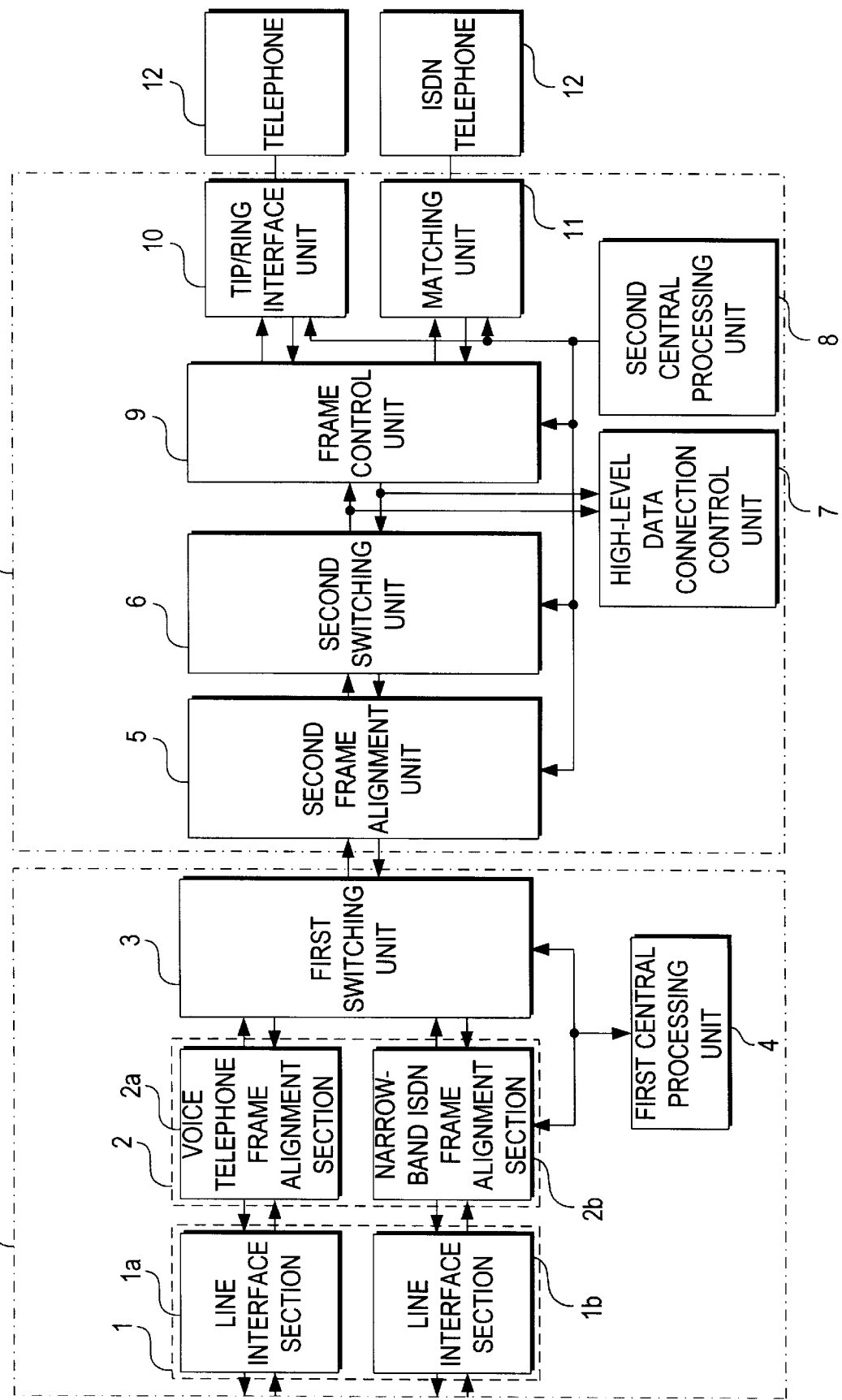
FIG. 1 is a block diagram of an optical CATV system having enhanced transmission efficiency of communication channels according to the present invention.
Figures 3, 4:
FIG. 3 is a block diagram of a general CATV system.
FIG. 4 is a format diagram of a transmission frame allotted for conventional voice telephone and narrow-band ISDN.

FIG. 1 is a block diagram of an optical CATV system having enhanced transmission efficiency of a subscriber network according to the present invention.

Referring to FIG. 1, the optical CATV system can offer telephone network and narrow-band ISDN services over one E1 (2.048 Mbps) between a line termination 100 constituting a distribution center and a subscriber unit 200.

The line termination 100 of the present invention comprises a line interface unit 1, a first frame alignment unit 2, a first switching unit 3, and a first central processing unit 4.

The line interface unit 1 comprises a voice telephone line interface section 1a for interfacing voice telephone lines and a narrow-band ISDN line interface section 1b for interfacing narrow-band ISDN lines. The line interface sections 1a and 1b transfer the voice telephone and ISDN frames received from the voice telephone and narrow-band ISDN lines to the subscriber unit, respectively. But, the voice telephone and ISDN frames received from the subscriber units are transferred to an exchanger by the line interface sections 1a and 1b. Digital data received through the voice telephone lines is transferred into the voice telephone line interface section 1a by a device installed before the line interface section 1a (for example, a converter for converting voice telephone signals into PCM (Pulse Code Modulation) signals).

The first frame alignment unit 2 comprises a voice telephone frame alignment section 2a and a narrow-band ISDN frame alignment section 2b. The frame alignment sections 2a and 2b realign the voice telephone/narrow-band ISDN frames transferred from the line interface unit 1 to monitor the state of them, respectively. The voice telephone/narrow-band ISDN frames transferred from the exchanger are realigned and monitored by the frame alignment sections 2a and 2b to extract information concerning the frames. The first switching unit 3 multiplexes the voice telephone and narrow-band ISDN frames received from the first frame alignment unit 2 into one E1 frame and transmits it to a network termination 200 of the subscriber unit. The first switching unit 3 demultiplexes the voice telephone/narrow-band ISDN frames, multiplexed and transferred from the network termination 200, into the voice telephone and narrow-band ISDN frames. The first central processing unit 4 controls the respective units; controlling the frame data transferred from the first frame alignment unit to be realigned, and the voice telephone and narrow-band ISDN frames to be multiplexed into one E1 frame.

The network termination 200 comprises a second frame alignment unit 5, a second switching unit 6, an HDLC unit 7, a second central processing unit 8, a frame control unit 9, a tip/ring interface unit 10, and a matching unit 11.

The second frame alignment unit 5 realigns the frames multiplexed by the first switching unit 3 of the line termination 100 to monitor the state of frame, realigning the voice telephone and narrow-band ISDN frames transferred from the subscriber unit to monitor the state of frames and generate information concerning the frames.

The second switching unit 6 separates the frames received from the second frame alignment unit 5 into a voice telephone channel and a narrow-band ISDN channel, multiplexing the voice telephone and narrow-band ISDN frames from the subscriber units into one frame.

The frame control unit 9 transfers the voice telephone frame received from the second switching unit 6 to the tip/ring interface unit 10. The frame control unit 9 extracts information concerning the start-up/stop and maintenance of subscriber units from the frame and transmits it to the second central processing unit 8. The frame control unit 9 extracts a physical layer data, that is, Cv value from the ISDN frame to send it to the HDLC unit 7, code-converting the physical layer data and sending it to an ISDN telephone 13 through the matching unit 11, performing the reverse process.

The HDLC unit 7 analyzes the Cv channel from the frames transferred from the second switching unit 6 and transfer it to the second central processing unit 8. The second central processing unit 8 controls the frame data received from the exchanger to connect the subscriber units according to the output signal of the HDLC unit 7 and performs the reverse process.

The tip/ring interface unit 10 converts the voice telephone data received from the frame control unit 9 into a tip/ring signal and transfers it to a subscriber telephone 12. The tip/ring interface unit 10 converts the tip/ring signal from the subscriber telephone 12 as voice telephone data and transmits it to the frame control unit 9 and the exchanger. The matching unit 13 transfers the ISDN frame received from the frame control unit 9 to the ISDN telephone 13 by the control of the second central processing unit 8 and perform the reverse process.

The enhancement of the transmission efficiency of communication channels in the optical CATV system of the present invention is described in detail with reference to FIG. 2.

A general optical CATV system, as shown in FIG. 1, comprises the line termination 100 located in the distribution center to offer voice telephone and narrow-band ISDN services and connecting an exchanger and subscriber units, and the network termination 200 for interfacing data between the subscriber units and line termination.

To describe the process of data transmission from the exchanger to each subscribers, the voice telephone and ISDN signals are transferred from the exchanger through the voice telephone and narrow-band ISDN lines to the voice telephone and narrow-band ISDN line interface sections 1a and 1b in the line interface unit 1, respectively. They are transmitted into the first frame alignment unit 2.

The voice telephone frame alignment section 2a in the first frame alignment unit 2 realigns the voice telephone frame to monitor the state of frame, transferring the monitored data to the first central processing unit 4 and the aligned voice telephone frame to the first switching unit 3. Realigning the frame is to get the SYNC of the frame and the SYNC and voltage level of each bit in a data into precise adjustment. The narrow-band ISDN frame alignment section 2b in the first frame alignment unit 2 realigns the narrow-band ISDN frame to monitor the state of frame, transferring the realigned narrow-band ISDN frame to the first switching unit 3 and the monitored data to the first central processing unit 4.

The first central processing unit 4 receives the frame monitored data to control the SYNC of the frame and the SYNC and voltage level of each bit to be into precise adjustment, and controls the respective sections to multiplex the voice telephone and narrow-band ISDN frames into one E1 frame.

The first switching unit 3 multiplexes the voice telephone and narrow-band ISDN frames into one E1 frame and transfers it to the subscriber units. The first switching unit 3 receives the signals each of which are transferred from the voice telephone and narrow-band ISDN frame alignment sections 2a and 2b in the frame alignment unit 2 and contained in one frame, storing them in an input memory (for example, register, RAM and the like).

The voice telephone signal is stored in one of the channels allotted for voice telephone signals in an output memory mapped as shown in FIG. 2, and then transferred to the subscriber unit 200 by the control of the first central processing unit 4. Similarly, the narrow-band ISDN signal is stored in one of the time slots (reference numerals 17 to 28 in FIG. 2) allotted for narrow-band ISDN signals in the output memory, and transferred to the subscriber unit 200 by the control of the first central processing unit 4.

FIG. 2 shows the format of the multiplexed transmission frame according to the present.

Referring to FIG. 2, nine channels for voice telephones are allotted to three subscribers and time slots for the narrow-band ISDN are to three subscribers. Accordingly, the time slots 1 to 9 are used for voice telephones and those 17 to 28 are for the narrow-band ISDN. The time slot 0 is for the frame synchronization and the time slot 16 is used for the voice telephone signal transmission (CAS signal communication).

The narrow-band ISDN comprises a 2B+D channel (B1, B2. image and voice signal channels, D: control signal channel) for data transmission, and a Cv1 channel for operation and maintenance. For the narrow-band ISDN, each subscriber uses four time slots so that twelve time slots are allotted for three subscribers.

After the voice telephone channels multiplexed into 155 Mbps and the B1, B2, D and Cv channels of the narrow-band ISDN are mapped to a 2.048 Mbps frame, the second frame alignment unit 5 realigns the frame received from the first switching unit 3, monitor the frame's state, and transfer the result to the second central processing unit 8. The second switching unit 6 separates the frame multiplexed from the voice telephone and narrow-band ISDN channels by the second frame alignment unit 5 into the voice telephone and narrow-band ISDN channels, as a reverse process by the second switching unit 3.

The frame control unit 9 bypasses the voice telephone channel transferred from the first switching unit 3 to the tip/ring interface unit 10 and converts the narrow-band ISDN channel into a format adequate to the ISDN telephone 13 to generate it to the matching unit 11. The frame control unit 9 transmits the Cv data of the ISDN channel to the HDLC unit 7.

The HDLC (High Data Link Controller) unit 7 analyzes the Cv channel transferred from the frame control unit 9 and generates the analyzed result to the second central processing unit 8. The second central processing unit 8 receives the result data of the monitored frames' states from the second frame alignment unit 5 and that of the analyzed Cv channel from the HDLC unit 7 to control the network termination 200.

The tip/ring interface unit 10 converts the voice telephone data into a tip/ring signal by the control of the second central processing unit 8 and generate it to the subscriber telephone 12. The matching unit 11 transmits the narrow-band ISDN frame received from the frame control unit 9 to the subscriber ISDN telephone 13.

In a data transmission from one subscriber to the exchanger, the tip/ring signal produced in the subscriber telephone 12 is converted into digital data (for example, PCM data or the like) by the tip/ring interface unit 10, bypassed by the frame control unit 9, and transmitted to the second switching unit 6. The narrow-band ISDN data generated in the ISDN telephone 13 is transferred to the frame control unit 9 through the matching unit 11.

The frame control unit 9 received the ISDN data from the matching unit 11 generates the narrow-band ISDN data transferred from the subscriber by E1 frame, and extracts information for the subscriber concerning the start-up/stop and maintenance from the ISDN data, sending it to the second central processing unit 8. The frame control unit 9 converts the code value obtained from the narrow-band ISDN data into Cv value, and transmits the error correction data generated by the HDLC unit 7 over the corresponding frame to the second switching unit 6.

Mapping the voice telephone and narrow-band ISDN frames received from the frame control unit 9 as one E1 frame, the second switching unit 6 transmits the E1 frame to the second frame alignment unit 5. The second alignment unit 5 realigns the frame, transmits it to the first switching unit 3, and transfers the result data of the monitored frames' states to the second central processing unit 8.

Receiving the frame multiplexed by the second frame alignment unit 5, the first switching unit 3 separates one E1 frame into voice telephone and narrow-band ISDN frames, transferring the voice telephone frame to the voice telephone frame alignment section 2a in the first frame alignment unit 2 and the narrow-band ISDN frame to the narrow-band ISDN frame alignment section 2b in the first frame alignment unit 2.

The voice telephone and narrow-band ISDN frame alignment sections 2a and 2b align the voice telephone and narrow-band ISDN frames, monitor the frames' states, and transmit the realigned voice telephone and narrow-band ISDN frames to the line interface unit 1.

The line interface unit 1 sends the voice telephone and narrow-band ISDN frames to the exchanger through the voice telephone and narrow-band ISDN lines, respectively.

It will be apparent to those skilled in the art that various modifications and variations can be made in the optical CATV system having enhanced transmission efficiency of transmission channels according to the present invention without departing from the spirit or scope of the invention. Thus, it is intended that the present invention cover the modifications and variations of this invention provided they come within the scope of the appended claims and their equivalents.

What is claimed is:

1. An optical CATV system having enchanced transmission efficiency of communication channels, which offers voice telephone and narrow-band ISDN services, the optical CATV system comprising:
a distribution center for transmitting a voice telephone data frame and a narrow-band ISDN data frame over one E1 frame, said distribution center comprising a line interface unit, a first frame alignment unit, a first switching unit, and a first central processing unit; and
a subscriber unit separately generating the voice telephone and narrow-band ISDN data frames from the E1 frame transferred from the distribution center, said subscriber unit comprising a second frame alignment unit, a second switching unit, an HDLC unit, a second CPU, a frame control unit, a tip/ring interface unit, and a matching unit.

2. An optical CATV system having enhanced transmission efficiency of communication channels, which offers voice telephone and narrow-band ISDN services, the optical CATV comprising:
a line interface means for generating voice telephone and narrow-band ISDN frames transferred from voice telephone/narrow-band ISDN lines at an output terminal, and reversely generating the voice telephone and narrow-band ISDN frames from the output terminal to the voice telephone/narrow-band ISDN lines;
a first frame alignment means for performing a first process of realigning the voice telephone and narrow-band ISDN frames transferred from the line interface means for monitoring the states of the frames and generating the result, and performing said first process in reverse;
a first switching means for performing a second process of multiplexing the voice telephone and narrow-band ISDN frames transferred from the first frame alignment means over one E1 frame, and performing said second process in reverse;
a second frame alignment means for performing a third process of realigning the multiplexed frames transferred from the first switching means for monitoring the states of the frame, and performing said third process in reverse;
a second switching means for demultiplexing the frames transferred from the second frame alignment means over voice telephone and narrow-band ISDN channels reversely transferred to generate the output to the second frame alignment means;
a frame control means for bypassing the voice telephone channel transferred from the second switching means, converting the narrow-band ISDN channel into a format adequate to an ISDN terminal, reading an ISDN an ISDN physical layer data, bypassing the voice telephone channel reversely transferred to generate it to the second switching means, and generating the narrow-band ISDN data, reversely transferred, to the second switching means by E1 frame;
a HDLC (high Data Link Controller) means for analyzing the physical layer data transferred from the frame control means;
a central processing means for receiving the monitored result of the states of the frame from the second frame alignment means and the analyzed result of the physical layer data from the HDLC control means for controlling the respective means;
a tip/ring interface means for converting the voice telephone data received from the frame control means into a tip/ring signal; and
a matching means for transmitting the ISDN frame received from the frame control means to a subscriber ISDN telephone.

3. The optical CATV system as defined in claim 2, wherein the first frame alignment unit comprises:
a voice telephone frame alignment unit for realigning the voice telephone frame transferred from the voice telephone line to monitor the frame's state; and
a narrow-band ISDN frame alignment unit for realigning the narrow-band ISDN frame transferred from the narrow-band ISDN line to monitor the frame's state.

4. The optical CATV system as defined in claim 2, wherein the first switching unit receives the voice telephone and narrow-band ISDN frames, allotting time slots 1 to 9 for voice telephone channels, time slots 17 to 28 for narrow-band ISDN channels, a time slot 0 for a frame synchronization channel, and a time slot 16 for a voice telephone signal transmission channel, to multiplex them over one E1 frame.

5. The optical CATV system as defined in claim 2 or 4, wherein the first switching unit stores the data contained in the voice telephone and narrow-band ISDN frames transferred from the frame alignment unit in an input memory unit, the stored voice telephone data being transferred into one of voice telephone data channels in an output memory unit, the stored narrow-band ISDN data being transferred into a time slot for one subscriber allotted for a narrow-band ISDN data channel in the output memory unit.

6. The optical CATV system as defined in claim 4, wherein one E1 frame multiplexed by the first switching unit has nine voice telephone channels with three channels per one subscriber and the narrow-band ISDN time slots for three subscribers.

* * * * *

UNITED STATES PATENT AND TRADEMARK OFFICE
CERTIFICATE OF CORRECTION

PATENT NO. : 6,088,723
DATED : July 11, 2000
INVENTOR(S) : Kee Pyong Shim

It is certified that error appears in the above-identified patent and that said Letters Patent are hereby corrected as shown below:

In the Assignee section on the cover page, change "Vo." to -- Co. --.

Signed and Sealed this

Twenty-second Day of May, 2001

Attest:

NICHOLAS P. GODICI

*Attesting Officer*     Acting Director of the United States Patent and Trademark Office